United States Patent
Sano et al.

(10) Patent No.: US 7,892,394 B2
(45) Date of Patent: Feb. 22, 2011

(54) PRESSURE-SENSITIVE ADHESIVE FOR APPLYING OPTICALLY FUNCTIONAL FILM, OPTICALLY FUNCTIONAL FILM AND PRODUCTION PROCESS FOR THE SAME

(75) Inventors: Toru Sano, Saitama (JP); Koichi Nagamoto, Saitama (JP); Kentaro Kusama, Saitama (JP)

(73) Assignee: Lintec Corporation, Tokyo (JP)

( * ) Notice: Subject to any disclaimer, the term of this patent is extended or adjusted under 35 U.S.C. 154(b) by 768 days.

(21) Appl. No.: 11/778,214

(22) Filed: Jul. 16, 2007

(65) Prior Publication Data

US 2008/0023132 A1 Jan. 31, 2008

(30) Foreign Application Priority Data

Jul. 26, 2006 (JP) .............................. 2006-203807

(51) Int. Cl.
- *B29C 65/00* (2006.01)
- *B32B 37/00* (2006.01)
- *B32B 38/04* (2006.01)
- *C09J 5/10* (2006.01)
- *C04B 37/00* (2006.01)
- *C08J 3/28* (2006.01)

(52) U.S. Cl. ................. 156/325; 156/275.7; 156/306.6; 522/153

(58) Field of Classification Search ............... 156/275.7, 156/306.6, 325; 522/153
See application file for complete search history.

(56) References Cited

U.S. PATENT DOCUMENTS

2005/0208296 A1* 9/2005 Saiki et al. .................. 428/343

2005/0208736 A1* 9/2005 Matsumura et al. ......... 438/460

* cited by examiner

*Primary Examiner*—Philip C Tucker
*Assistant Examiner*—Michael N Orlando
(74) *Attorney, Agent, or Firm*—Oblon, Spivak, McClelland, Maier & Neustadt, L.L.P.

(57) ABSTRACT

Provided is a pressure-sensitive adhesive for an optically functional film which can carry out adhesion with a good durability in adhesion of an optically functional film such as adhesion of a polarizing plate, particularly a polarizing plate integrated with a viewing angle expanding film and the like with a liquid crystal cell, adhesion of a polarizing plate with a retardation film, adhesion of a retardation film with a retardation film and adhesion of a retardation film with a liquid crystal cell and which has the characteristics that a liquid crystal display obtained therefrom is less liable to cause light leakage even under the environment of high temperature and high humidity and that static electricity is less liable to be produced when peeling off a release film from a pressure-sensitive adhesive layer.

The pressure-sensitive adhesive for applying an optically functional film comprises a pressure-sensitive adhesive resin and an antistatic agent, wherein a storage elastic modulus (G') at 23° C. is 0.3 MPa or more, and a charged voltage on the surface of a layer comprising the above pressure-sensitive adhesive which is measured 5 seconds later since peeling off a release film brought into contact with the above pressure-sensitive adhesive layer under the environment of 23° C. and a relative humidity of 50% is 1.0 kV or less.

20 Claims, 3 Drawing Sheets

PRESSURE-SENSITIVE ADHESIVE FOR APPLYING OPTICALLY FUNCTIONAL FILM, OPTICALLY FUNCTIONAL FILM AND PRODUCTION PROCESS FOR THE SAME

BACKGROUND OF THE INVENTION

1. Field of the Invention

The present invention relates to a pressure-sensitive adhesive for applying an optically functional film, an optically functional film with the pressure-sensitive adhesive and a production process for the same, and an optical film using the above optically functional film with the pressure-sensitive adhesive and a production process for the same. More specifically, the present invention relates to a pressure-sensitive adhesive for an optically functional film which is suitably laminated on a polarizing plate, particularly a polarizing plate integrated with a viewing angle expanding film or a retardation film or a polarizing plate comprising a retardation film laminated thereon and can apply the above polarizing plate on a liquid crystal cell or a retardation film with good durability and which has the characteristics that a liquid crystal display (LCD) obtained therefrom is less liable to cause light leakage even under the environment of high temperature and high humidity and that static electricity is less liable to be produced when peeling off a release film from a pressure-sensitive adhesive layer, an optically functional film with the above pressure-sensitive adhesive and a production process for the same, and an optical film and a production process for the same.

2. Description of the Related Art

A durability which does not bring about lifting and peeling even under various environments and a performance which can prevent light leakage in a liquid crystal cell are required to a pressure-sensitive adhesive used for applying a polarizing plate which is a member of a liquid crystal display with a liquid crystal cell. The above light leakage is caused as the result that a residual stress in a polarizing plate becomes uneven when a stress brought about by a change in a dimension such as shrinkage and expansion in the polarizing plate particularly under high temperature and high humidity environment can not be absorbed in a pressure-sensitive adhesive layer.

In order to solve the above problem on the light leakage, disclosed is a technique in which a pressure-sensitive adhesive is suitably softened and provided with a stress relaxation property by adding a low molecular weight substance such as a plasticizer to the pressure-sensitive adhesive (refer to, for example, a patent document 1). However, addition of the low molecular weight substance causes stain of the adherent when peeling off the polarizing plate and, in addition thereto, results in lowering the holding power, and lifting and peeling brought about by the passage of time are liable to be caused.

Accordingly, it is an issue to allow the adhesion durability and the light leakage preventing property to stand together.

On the other hand, in the case of a liquid crystal display which is operated by an IPS (in-plane-switching) system, a cell substrate on one side of a liquid crystal cell is subjected usually to ITO (indium tin oxide) treatment, but the opposite surface is not subjected to antistatic treatment. Accordingly, images are disturbed by static electricity generated in applying an optical film on a surface which is not subjected to ITO treatment. An optical film, a pressure-sensitive adhesive, a release film, a surface protecting film and the like are constituted by plastic materials and have a high electrical insulating property, and therefore they generate static electricity in rubbing and peeling. Accordingly, static electricity is generated when peeling off a release film and a surface protecting film from an optical film. Dirts and dusts in the periphery are introduced by the above static electricity, and when voltage is applied in the states that static electricity still remains, brought about are the problems that orientation of liquid crystal molecules is lost and that defect of a liquid crystal panel is caused.

Further, also in a finished liquid crystal panel, electrification is caused by bringing into contact with a diffusion film in an optical film at an incident side (lower surface) when wiping stains on the surface of the optical film at a visible side (upper surface) with a cloth and the like, and therefore the problem that the images are disturbed is involved therein. Also in a liquid crystal display which is operated by a VA (vertical alignment) system, the same problem is brought about in the case of a constitution in which a cell substrate subjected to ITO treatment is used only for one side of a liquid crystal cell.

In recent years, effective antistatic measures are strongly required as an increase in a size of a display equipment and an improvement in an driving system are advanced. Proposed is, for example, a method in which a surfactant having a low molecular weight is added to a pressure-sensitive adhesive to transfer the surfactant to the surface of the pressure-sensitive adhesive and in which moisture in the air is allowed to be adsorbed in the surfactant transferred to the surface of the pressure-sensitive adhesive to thereby exhibit the antistatic performance (refer to, for example, a patent document 2). However, it is difficult to satisfy both the antistatic performance and the pressure-sensitive adhesive property by the above method, and involved therein is the problem that the antistatic performance and an adhesive strength of the pressure-sensitive adhesive depend on temperature and humidity to a large extent.

Patent document 1: Japanese Patent No. 3272921

Patent document 2: Japanese Patent Application Laid-Open No. 138901/1986

SUMMARY OF THE INVENTION

In light of the situation described above, an object of the present invention is to provide a pressure-sensitive adhesive for an optically functional film which can carry out adhesion with a good durability in adhesion of an optically functional film, to be more specific, adhesion of a polarizing plate, particularly a polarizing plate integrated with a viewing angle expanding film or a retardation film with a liquid crystal cell, adhesion of a polarizing plate with a retardation film, adhesion of a retardation film with a retardation film and adhesion of a retardation film with a liquid crystal cell and which has the characteristics that a liquid crystal display obtained therefrom is less liable to cause light leakage even under the environment of high temperature and high humidity and that static electricity is less liable to be produced when peeling off a release film from a pressure-sensitive adhesive layer, an optically functional film with the above pressure-sensitive adhesive and a production process for the same, and an optical film and a production process for the same.

Intensive researches repeated by the present inventors in order to solve the problems described above have resulted in finding that the above object can be achieved by a pressure-sensitive adhesive which comprises a pressure-sensitive adhesive resin and an antistatic agent and has a specific storage elastic modulus (G') and in which a charged voltage on the surface of a pressure-sensitive adhesive layer in peeling off a release film from the pressure-sensitive adhesive layer is a specific value or lower. The present invention has been completed based on the above knowledge.

That is, the present invention provides:

(1) a pressure-sensitive adhesive for applying an optically functional film comprising a pressure-sensitive adhesive resin and an antistatic agent, wherein a storage elastic modulus (G') at 23° C. is 0.3 MPa or more, and a charged voltage on the surface of a layer comprising the above pressure-sensitive adhesive which is measured 5 seconds later since peeling off a release film attaching to the above pressure-sensitive adhesive layer under the environment of 23° C. and a relative humidity of 50% is 1.0 kV or less, (2) the pressure-sensitive adhesive for applying an optically functional film as described in the above item (1), wherein a half-life of a charged voltage in applying a voltage of 10 kV to the surface of the pressure-sensitive adhesive layer for one minute under the environment of 23° C. and a relative humidity of 50% is 300 seconds or shorter, (3) the pressure-sensitive adhesive for applying an optically functional film as described in the above item (1) or (2), wherein a blending amount of the antistatic agent is 0.05 to 10 mass parts per 100 mass parts of the pressure-sensitive adhesive resin, (4) the pressure-sensitive adhesive for applying an optically functional film as described in any of the above items (1) to (3), wherein the storage elastic modulus (G') at 23° C. is 0.3 to 15 MPa, (5) the pressure-sensitive adhesive for applying an optically functional film as described in any of the above items (1) to (4), wherein the storage elastic modulus (G') at 80° C. is 0.3 MPa or more, (6) the pressure-sensitive adhesive for applying an optically functional film as described in the above item (5), wherein the storage elastic modulus (G') at 80° C. is 0.3 to 10 MPa, (7) the pressure-sensitive adhesive for applying an optically functional film as described in any of the above items (1) to (6), wherein the optically functional film described above is a polarizing plate and/or a retardation film, and it is used for applying of a polarizing plate with a liquid crystal glass cell, applying of a polarizing plate with a retardation film, applying of a retardation film with a retardation film or applying of a retardation film with a liquid crystal glass cell, (8) the pressure-sensitive adhesive for applying an optically functional film as described in any of the above items (1) to (7), wherein the pressure-sensitive adhesive resin described above comprises (A) an acrylic copolymer and (B) an active energy beam-curable compound, and a pressure-sensitive adhesive material obtained by adding the antistatic agent described above to the above pressure-sensitive adhesive resin is irradiated with an active energy beam, (9) the pressure-sensitive adhesive for applying an optically functional film as described in the above item (8), wherein the active energy beam-curable compound of the component (B) is a multifunctional (meth)acrylate base monomer having a molecular weight of less than 1000,

(10) the pressure-sensitive adhesive for applying an optically functional film as described in the above item (9), wherein the multifunctional (meth)acrylate base monomer has a cyclic structure,

(11) the pressure-sensitive adhesive for applying an optically functional film as described in the above item (10), wherein the multifunctional (meth)acrylate base monomer has an isocyanurate structure,

(12) the pressure-sensitive adhesive for applying an optically functional film as described in any of the above items (8) to (11), wherein a content ratio of the component (A) to the component (B) is 100:1 to 100:100 in terms of a mass ratio,

(13) the pressure-sensitive adhesive for applying an optically functional film as described in any of the above items (8) to (12), wherein the pressure-sensitive adhesive material further comprises a cross-linking agent as a component (C),

(14) the pressure-sensitive adhesive for applying an optically functional film as described in any of the above items (8) to (13), wherein the pressure-sensitive adhesive material further comprises a silane coupling agent as a component (D),

(15) the pressure-sensitive adhesive for applying an optically functional film as described in any of the above items (7) to (14), wherein the polarizing plate comprises a polarizing film integrated with a viewing angle expanding film or a retardation film,

(16) the pressure-sensitive adhesive for applying an optically functional film as described in any of the above items (1) to (15), wherein an adhesive strength to non-alkali glass is 0.2 N/25 mm or more,

(17) the pressure-sensitive adhesive for applying an optically functional film as described in any of the above items (1) to (16), wherein an adhesive strength to polycarbonate is 5N/25 mm or more,

(18) the pressure-sensitive adhesive for applying an optically functional film as described in any of the above items (1) to (17), wherein a gel ratio is 85% or more,

(19) an optically functional film with the pressure-sensitive adhesive, characterized by having a layer comprising the pressure-sensitive adhesive as described in any of the above items (1) to (18) on an optically functional film,

(20) a production process for the optically functional film with the pressure-sensitive adhesive as described in the above item (19), characterized by applying the optically functional film on a pressure-sensitive adhesive material layer provided on a release layer of a release sheet and then irradiating the release sheet side with an active energy beam,

(21) an optical film comprising a polarizing plate and a retardation film, wherein the polarizing plate and the retardation film is laminated with the pressure-sensitive adhesive as described in any of the above items (1) to (18),

(22) a pressure-sensitive adhesive sheet comprising the pressure-sensitive adhesive as described in any of the above items (1) to (18) which is interposed between two release sheets so that the pressure-sensitive adhesive is brought into contact with release layer sides of the release sheets and

(23) a production process for an optically functional film, comprising applying a polarizing plate on a retardation film with the pressure-sensitive adhesive sheet as described in the above item (22).

According to the present invention, capable of being obtained is a pressure-sensitive adhesive for an optically functional film which can carry out adhesion with a good durability in adhesion of an optically functional film, to be more specific, adhesion of a polarizing plate, particularly a polarizing plate integrated with a viewing angle expanding film or a retardation film with a liquid crystal cell, adhesion of a polarizing plate with a retardation film, adhesion of a retardation film with a retardation film and adhesion of a retardation film with a liquid crystal cell and which has the characteristics that a liquid crystal display obtained therefrom is less liable to cause light leakage even under the environment of high temperature and high humidity and that static electricity is less liable to be produced when peeling off a release film from a pressure-sensitive adhesive layer.

BRIEF DESCRIPTIONS OF THE DRAWINGS

EXPLANATIONS OF THE CODES 1, 2: Liquid crystal displays
11, 21: Polarizing plates
12, 22, 25: Pressure-sensitive adhesives
13, 23: Glass (liquid crystal cells)
24: Retardation film

DETAILED DESCRIPTION OF THE INVENTION

The present invention relates to a pressure-sensitive adhesive for applying an optically functional film, particularly to a pressure-sensitive adhesive used for adhesion of a polarizing plate which is a kind of an optically functional film with a liquid crystal cell, adhesion between optically functional films such as a polarizing plate with a retardation film or a retardation film with a retardation film and adhesion of a retardation film which is a kind of an optically functional film with a liquid crystal cell.

Figure 1:
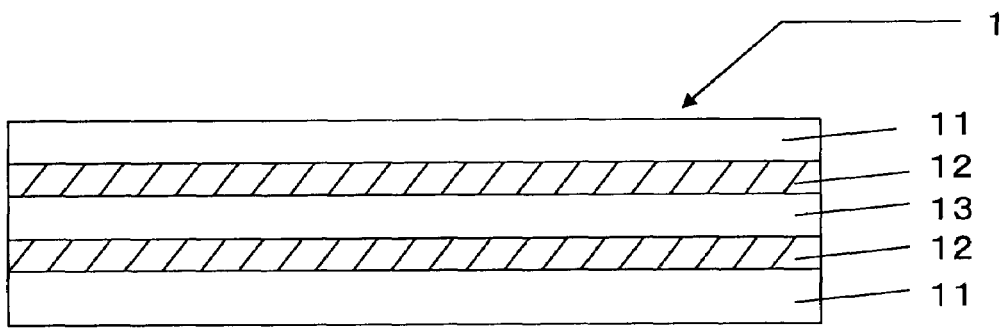
FIG. 1 is an outline drawing showing a constitution of LCD.

First, a case in which a polarizing plate is applied on a liquid crystal cell of a liquid crystal display (LCD) shall be explained with reference to FIG. 1.

A liquid crystal cell 13 has usually a structure in which two transparent electrode substrates having orientation layers formed thereon are arranged with the orientation layers turned to an inside so that a prescribed interval is formed by spacers, in which the periphery thereof is sealed to interpose a liquid crystal material in the above interval and in which polarizing plates 11 are disposed respectively on the two transparent electrode substrates described above via pressure-sensitive adhesives 12. In general, the polarizing plate described above comprises a polarizing film having a three layer structure in which optically isotropic films, for example, a triacetyl cellulose (TAC) films are applied on both surfaces of a polyvinyl alcohol base polarizer, and a pressure-sensitive adhesive layer is further provided on one surface thereof for the purpose of applying on an optical part such as a liquid crystal cell. The pressure-sensitive adhesive of the present invention is suitably used as a material for the above pressure-sensitive adhesive layer.

Figure 2:
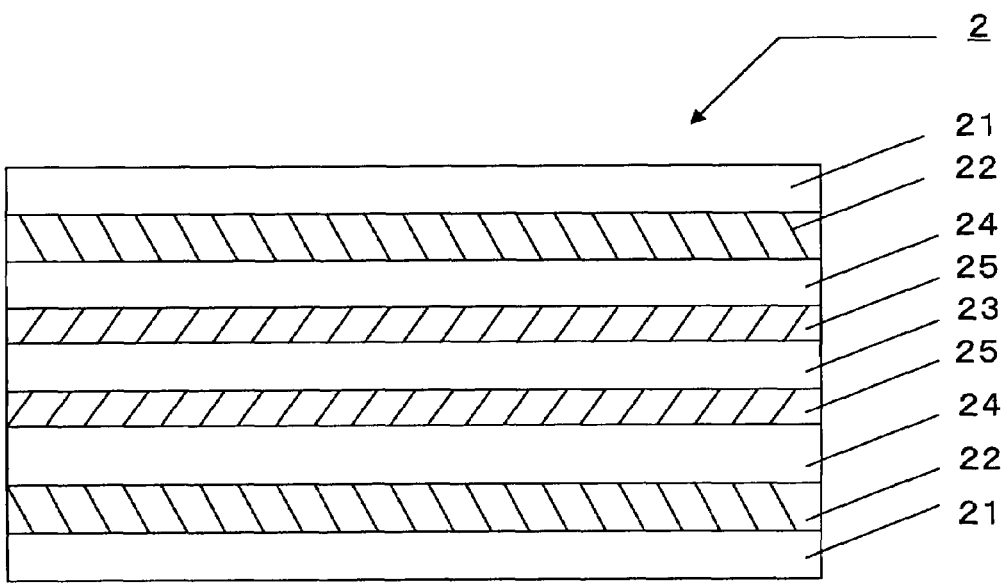
FIG. 2 is an outline drawing showing a constitution of LCD.

Further, as shown in a schematic drawing of FIG. 2, a retardation film 24 is disposed in a certain case between a polarizing plate 21 and a liquid crystal cell 23 via pressure-sensitive adhesives 22 and 25 in order to improve the viewing angle characteristics. The pressure-sensitive adhesive of the present invention is suitably used as the pressure-sensitive adhesives 22 and 25 used in the above case.

The pressure-sensitive adhesive of the present invention for applying an optically functional film is provided by a pressure-sensitive adhesive comprising a pressure-sensitive adhesive resin and an antistatic agent as principal components.

The pressure-sensitive adhesive resin comprises preferably (A) an acrylic copolymer and (B) an active energy beam-curable compound, and preferred is a pressure-sensitive adhesive obtained by irradiating a pressure-sensitive adhesive material prepared by adding the antistatic agent described above to the above pressure-sensitive adhesive resin with an active energy beam.

(Meth)acrylic ester base copolymers can be given as the acrylic copolymer which is the component (A). In the present invention, (meth)acrylic ester means both of acrylic ester and methacrylic ester. The same shall apply to other similar terms.

Copolymers having cross-linking points which can be cross-linked by various cross-linking methods are preferably used as the (meth)acrylic ester base copolymers described above. The above (meth)acrylic ester base copolymers having cross-linking points shall not specifically be restricted, and optional copolymers suitably selected from (meth)acrylic ester base copolymers which have so far been conventionally used as resin components for pressure-sensitive adhesives can be used.

Copolymers of (meth)acrylic esters in which an alkyl group in an ester part has 1 to 20 carbon atoms, monomers having a cross-linkable functional group in a molecule and other monomers which are used if necessary can preferably be given as the above (meth)acrylic ester base copolymers having cross-linking points. In this regard, the examples of the (meth)acrylic ester in which an alkyl group in an ester part has 1 to 20 carbon atoms include methyl (meth)acrylate, ethyl (meth)acrylate, propyl (meth)acrylate, butyl (meth)acrylate, pentyl (meth)acrylate, hexyl (meth)acrylate, cyclohexyl (meth)acrylate, 2-ethylhexyl (meth)acrylate, isooctyl (meth)acrylate, decyl (meth)acrylate, dodecyl (meth)acrylate, myristyl (meth)acrylate, palmityl (meth)acrylate, stearyl (meth)acrylate and the like. They may be used alone or in combination of two or more kinds thereof.

On the other hand, the monomers having a cross-linkable functional group in a molecule contain preferably at least one of a hydroxyl group, a carboxyl group, an amino group and an amide group as a functional group, and the specific examples thereof include hydroxyalkyl (meth)acrylates such as 2-hydroxyethyl(meth)acrylate, 2-hydroxypropyl(meth)acrylate, 3-hydroxypropyl(meth)acrylate, 2-hydroxybutyl(meth)acrylate, 3-hydroxybutyl(meth)acrylate and 4-hydroxybutyl (meth)acrylate; acrylamides such as (meth)acrylamide, N-methyl(meth)acrylamide and N-methylol(meth)acrylamide; (meth)acrylic monoalkylamino esters such as monomethylaminoethyl (meth)acrylate, monoethylaminoethyl (meth)acrylate, monomethylaminopropyl(meth)acrylate and monoethylaminopropyl(meth)acrylate; and ethylenically unsaturated carboxylic acids such as acrylic acid, methacrylic acid, crotonic acid, maleic acid, itaconic acid and citraconic acid. The above monomers may be used alone or in combination of two or more kinds thereof.

In the above pressure-sensitive adhesive material, the (met) acrylic ester base copolymer used as the component (A) shall not specifically be restricted in a copolymer form, and it may be any of random, block and graft copolymers. The copolymers having a molecular weight of 500,000 or more in terms of a weight-average molecular weight are usually used. If the above weight-average molecular weight is 500,000 or more, the adhesion with an adherend and the adhesive durability are satisfactory, and lifting and peeling are not brought about. Considering the adhesion and the adhesive durability, the above weight-average molecular weight is preferably 600,000 to 2,200,000, particularly preferably 700,000 to 2,000,000.

The weight-average molecular weight described above is a value reduced to polystyrene which is measured by gel permeation chromatography (GPC).

Further, in the above (meth)acrylic ester base copolymer, a content of a monomer unit having a cross-linkable functional group in a molecule falls preferably in a range of 0.01 to 10 mass %. If the above content is 0.01 mass % or more, cross-linking is sufficiently expedited by reaction with a cross-linking agent described later, and the durability is improved. On the other hand, if the content is 10 mass % or less, an aptitude of applying onto a liquid crystal glass cell or a retardation film is prevented from being reduced due to the too high cross-linking degree, and therefore it is preferred. Considering the durability and the aptitude of applying onto a liquid crystal glass cell or a retardation film, a content of the above monomer unit having a cross-linkable functional group falls more preferably in a range of 0.05 to 7.0 mass %, particularly preferably 0.2 to 6.0 mass %.

In the present invention, the (meth)acrylic ester base copolymer of the component (A) may be used alone or in combination of two or more kinds thereof.

Combined use of, for example, (meth)acrylic ester base copolymers comprising 0.1 to 10 mass % (monomer composition ratio) of monomers having a hydroxyl group and (meth)acrylic ester base copolymers comprising 0.1 to 10 mass % (monomer composition ratio) of monomers having a carboxyl group in a range of 100:1 to 100:50 (mass ratio) as the (meth)acrylic ester base copolymer of the component (A) makes it possible to obtain a pressure-sensitive adhesive which can readily be removed if necessary after applying an optically functional film on a liquid crystal cell.

In the above pressure-sensitive adhesive material, multifunctional (meth)acrylate base monomers having a molecular weight of less than 1000 can preferably be given as the active energy beam-curable compound used as the component (B).

The above multifunctional (meth)acrylate base monomers having a molecular weight of less than 1000 include, for example, a difunctional type such as 1,4-butanediol di(meth)acrylate, 1,6-hexanediol di(meth)acrylate, neopentyl glycol di(meth)acrylate, polyethylene glycol di(meth)acrylate, neopentyl glycol adipate di(meth)acrylate, hydroxypivalic acid neopentyl glycol di(meth)acrylate, dicyclopentanyl di(meth)acrylate, caprolactone-modified dicyclopentenyl di(meth)acrylate, ethylene oxide-modified phosphoric acid di(meth)acrylate, di(acryloxyethyl)isocyanurate, allylated cyclohexyl di(meth)acrylate, dimethyloldicyclopentane di(meth)acrylate, ethylene oxide-modified hydrophthalic acid di(meth)acrylate, tricyclodecanedimethanol(meth)acrylate, neopentyl glycol-modified trimethylolpropane di(meth)acrylate, adamantane di(meth)acrylate and 9,9-bis[4-(2-acryloyloxyethoxy)phenyl]fluorene; a trifunctional type such as trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate and tris(acryloxyethyl)isocyanurate; a tetrafunctional type such as diglycerin tetra(meth)acrylate and pentaerythritol tetra(meth)acrylate; a pentafunctional type such as propionic acid-modified dipentaerythritol penta(meth)acrylate; and a hexafunctional type such as dipentaerythritol hexa(meth)acrylate and caprolactone-modified dipentaerythritol hexa(meth)acrylate.

In the present invention, only one kind of the above multifunctional (meth)acrylate base monomers may be used alone or they may be used in combination of two or more kinds thereof. Among them, those having a cyclic structure in a skeleton structure are preferably contained therein. The cyclic structure may be a carbocyclic structure or a heterocyclic structure and may be a monocyclic structure or a polycyclic structure. Suited as the above multifunctional (meth)acrylate base monomer are, for example, those having an isocyanurate structure such as di(acryloxyethyl)isocyanurate and tris(acryloxyethyl)isocyanurate, dimethyloldicyclopentane diacrylate, ethylene oxide-modified hexahydrophthalic acid diacrylate, tricyclodecanedimethanol acrylate, neopentyl glycol-modified trimethylolpropane diacrylate and adamantane diacrylate.

An acrylate base oligomer of an active energy beam-curable type can be used as the component (B). The examples of the above acrylate base oligomer include polyester acrylates, epoxy acrylates, urethane acrylates, polyether acrylates, polybutadiene acrylates and silicone acrylates.

In this respect, the polyester acrylate base oligomers are obtained, for example, by esterifying the hydroxyl groups of a polyester oligomer having hydroxyl groups at both ends which is obtained by condensation of polyvalent carboxylic acid and polyhydric alcohol with (meth)acrylic acid or by esterifying a hydroxyl group at an end of an oligomer obtained by adding alkylene oxide to polyvalent carboxylic acid with (meth)acrylic acid. The epoxy acrylate base oligomers are obtained, for example, by reacting an oxirane ring of a bisphenol type epoxy resin or a novolak type epoxy resin having a relatively low molecular weight with (meth)acrylic acid and then esterifying it. Further, capable of being used as well are epoxy acrylate oligomers of a carboxyl-modified type obtained by modifying partially the above epoxy acrylate base oligomers with dibasic carboxylic anhydride. The urethane acrylate base oligomers can be obtained, for example, by esterifying a polyurethane oligomer obtained by reacting polyetherpolyol or polyesterpolyol with polyisocyanate with (meth)acrylic acid, and the polyol acrylate base oligomers can be obtained by esterifying a hydroxyl group of polyetherpolyol with (meth)acrylic acid.

A weight-average molecular weight of the acrylate base oligomers described above is selected in a range of preferably 50,000 or less, more preferably 500 to 50,000 and further preferably 3,000 to 40,000 in terms of a value reduced to standard polymethyl methacrylate which is measured by GPC method.

The above acrylate base oligomers may be used alone or in combination of two or more kinds thereof.

In the present invention, an adduct acrylate base polymer in which a group having a (meth)acryloyl group is introduced into a side chain can also be used as the component (B). The above adduct acrylate base polymer can be obtained, for example, by using a copolymer of (meth)acrylic ester and a monomer having a cross-linkable functional group in a molecule, which is explained in the (meth)acrylic ester base copolymer of the component (A) described above, to react a part of the cross-linkable functional group of the above copolymer with a compound having a (meth)acryloyl group and a group which is reactable with the above cross-linkable functional group. A weight-average molecular weight of the above adduct acrylate base polymer is usually 500,000 to 2,000,000 in terms of a value reduced to polystyrene.

In the present invention, one suitably selected from the multifunctional acrylate base monomer, the acrylate base oligomer and the adduct acrylate base polymer each described above may be used as the component (B) or two or more kinds selected from them may be used in combination.

In the present invention, a content ratio of the acrylic copolymer of the component (A) to the active energy beam-curable compound of the component (B) falls in a range of preferably 100:1 to 100:100, more preferably 100:5 to 100:50 and further preferably 100:10 to 100:40 in terms of a mass ratio from the viewpoint of the performances of the pressure-sensitive adhesive obtained.

Next, the preferred antistatic agent used for the pressure-sensitive adhesive of the present invention includes ionic conductors, ionic liquids, surfactants and the like, and the ionic conductors and the ionic liquids are particularly preferred.

<Ionic Conductor>

The ionic conductor includes ionic conductors including alkaline metal salts and polyether compounds having an alkylene oxide chain.

The examples of the alkaline metal salts include metal salts comprising lithium, sodium and potassium, and to be specific, they are metal salts constituted from cations such as $Li^+$, $Na^+$, $K^+$ and the like and anions such as $Cl^-$, $Br^-$, $I^-$, $BF_4^-$, $PF_6^-$, $SCN^-$, $ClO_4^-$, $CF_3SO_3^-$, $(CF_3SO_2)_2N^-$, $(CF_3SO_2)C^-$ and the like. The alkaline metal salts are particularly preferably lithium salts such as $LiBr$, $LiI$, $LiBF_4$, $LiPF_6$, $LiSCN$, $LiClO_4$, $LiCF_3SO_3$, $Li(CF_3SO_2)_2N$, $Li(CF_3SO_2)C$ and the like.

The polyether compounds include polyetherpolyols and polyesterpolyols. The examples of the polyetherpolyols include polyethylene glycol, polypropylene glycol, polytetraethylene ether glycol and derivatives thereof.

The examples of the polyesterpolyols include reaction products of acid components with glycol components or polyol components. The acid components include terephthalic acid, adipic acid, azelaic acid, sebacic acid, phthalic anhydride, isophthalic acid, trimellitic acid and the like. The glycol components include ethylene glycol, propylene glycol, diethylene glycol, butylene glycol, 1,6-hexane glycol, 3-methyl-1,5-pentanediol, 3,3'-dimethylolheptane, polyoxyethylene glycol, polyoxypropylene glycol, 1,4-butanediol, neopentyl glycol, butylethylpentanediol and the like. The polyol components include glycerin, trimethylolpropane, pentaerythritol and the like. In addition thereto, they include polyesterpolyols and the like obtained by ring-opening polymerization lactones such as polycaprolactone, poly(β-methyl-γ-valerolactone), polyvalerolactone and the like. Further, organopolysiloxanes having an alkylene oxide chain on a side chain which are disclosed in Japanese Patent Application Laid-Open No. 31380/1994 can be used as the polyether compound.

Compounds which are liquid at room temperature (25° C.) are preferably used as the polyether compound.

<Ionic Liquid>

The ionic liquid denotes fused salts (ionic compounds) which are liquid at room temperature (25° C.). Nitrogen-containing onium salts, sulfur-containing onium salts and phosphorus-containing onium salts are preferably used as the ionic liquid, and compounds comprising organic cationic components and anionic components represented by the following Formulas (1) to (4) are preferably used because of the reason that the particularly excellent antistatic performance is obtained.

(1)

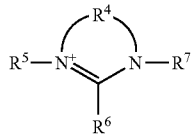

(2)

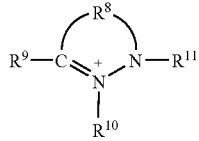

(3)

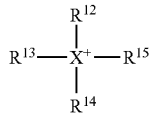

(4)

In Formula (1), $R^1$ represents a hydrocarbon group having 4 to 20 carbon atoms which may contain a hetero atom. $R^2$ and $R^3$ each represent independently a hydrogen atom or a hydrocarbon group having 1 to 16 carbon atoms which may contain a hetero atom. However, when a nitrogen atom contains a double bond, $R^3$ is not present.

In Formula (2), $R^4$ represents a hydrocarbon group having 2 to 20 carbon atoms which may contain a hetero atom. $R^5$, $R^6$ and $R^7$ each represent independently a hydrogen atom or a hydrocarbon group having 1 to 16 carbon atoms which may contain a hetero atom.

In Formula (3), $R^8$ represents a hydrocarbon group having 2 to 20 carbon atoms which may contain a hetero atom. $R^9$, $R^{10}$ and $R^{11}$ each represent independently a hydrogen atom or a hydrocarbon group having 1 to 16 carbon atoms which may contain a hetero atom.

In Formula (4), X represents a nitrogen atom, a sulfur atom or a phosphorus atom, and $R^{12}$, $R^{13}$, $R^{14}$ and $R^{15}$ each represent independently a hydrocarbon group having 1 to 20 carbon atoms which may contain a hetero atom. However, when X is a sulfur atom, $R^{12}$ is not present.

A cation represented by Formula (1) includes a pyridinium cation, a piperidinium cation, a pyrrolidinium cation, cations having a pyrroline skeleton, cations having a pyrrole skeleton and the like. The specific examples thereof include a 1-ethylpyridinium cation, a 1-butylpyridinium cation, a 1-hexylpyridinium cation, a 1-butyl-3-methylpyridinium cation, a 1-butyl-4-methylpyridinium cation, a 1-hexyl-3-methylpyridinium cation, a 1-butyl-3,4-dimethylpyridinium cation, a 1,1-dimethylpyrrolidinium cation, a 1-ethyl-1-methylpyrrolidinium cation, a 1-methyl-1-propylpyrrolidinium cation, a 2-methyl-1-pyrroline cation, a 1-ethyl-2-phenylindole cation, a 1,2-dimethylindole cation, a 1-ethylcarbazole cation and the like.

A cation represented by Formula (2) includes an imidazolium cation, a tetrahydropyrimidinium cation, a dihydropyrimidinium cation and the like. The specific examples thereof include a 1,3-dimethylimidazolium cation, 1,3-diethylimidazolium cation, a 1-ethyl-3-methylimidazolium cation, a 1-butyl-3-methylimidazolium cation, a 1-hexyl-3-methylimidazolium cation, a 1-octyl-3-methylimidazolium cation, a 1-decyl-3-methylimidazolium cation, a 1-dodecyl-3-methylimidazolium cation, a 1-tetradecyl-3-methylimidazolium cation, a 1,2-dimethyl-3-propylimidazolium cation, a 1-ethyl-2,3-dimethylimidazolium cation, a 1-butyl-2,3-dimethylimidazolium cation, a 1-hexyl-2,3-dimethylimidazolium cation, a 1,3-dimethyl-1,4,5,6-tetrahydropyrimidinium cation, a 1,2,3-trimethyl-1,4,5,6-tetrahydropyrimidinium cation, a 1,2,3,4-tetramethyl-1,4,5,6-tetrahydropyrimidinium cation, a 1,2,3,5-tetramethyl-1,4,5,6-tetrahydropyrimidinium cation, a 1,3-dimethyl-1,4-dihydropyrimidinium cation, a 1,3-dimethyl-1,6-dihydropyrimidinium cation, a 1,2,3-trimethyl-1,4-dihydropyrimidinium cation, a 1,2,3-trimethyl-1,6-dihydropyrimidinium cation, a 1,2,3,4-tetramethyl-1,4-dihydropyrimidinium cation, a 1,2,3,4-tetramethyl-1,6-dihydropyrimidinium cation and the like.

A cation represented by Formula (3) includes a pyrazolium cation, a pyrazolinium cation and the like. The specific examples thereof include a 1-methylpyrazolium cation, a 3-methylpyrazolium cation, a 1-ethyl-2-methylpyrazolinium cation and the like.

A cation represented by Formula (4) includes a tetraalkylammonium cation, a trialkylsulfonium cation, a tetraalkylphosphonium cation, cations obtained by substituting a part of the alkyl groups described above with an alkenyl group, an alkoxy group and an epoxy group and the like.

The specific examples of the above cations include cations such as a tetramethylammonium cation, a tetraethylammonium cation, a tetrabutylammonium cation, a tetrahexylammonium cation, an N,N-dimethyl-N,N-dipropylammonium cation, an N,N-dimethyl-N,N-dihexylammonium cation, an N,N-dipropyl-N,N-dihexylammonium cation, a trimethylsulfonium cation, a triethylsulfonium cation, a tributylsulfonium cation, a trihexylsulfonium cation, a tetramethylphosphonium cation, a tetraethylphosphonium cation, a tetrabutylphosphonium cation, a tetrahexylphosphonium cation, a diallyldimethylammonium cation, a triethylmethylammonium cation, a tributylethylammonium cation, a trimethyldecylammonium cation, an N,N-diethyl-N-methyl-N-(2-methoxyethyl)ammonium cation, a glycidyltrimethylammonium cation, an N,N-dimethyl-N-ethyl-N-propylammonium cation, an N,N-dimethyl-N-ethyl-N-butylammonium cation, an N,N-dimethyl-N-ethyl-N-pentylammonium cation, an N,N-dimethyl-N-ethyl-N-hexylammonium cation, an N,N-dimethyl-N-ethyl-N-heptylammonium cation, an N,N-dimethyl-N-ethyl-N-nonylammonium cation, an N,N-dimethyl-N-propyl-N-butylammonium cation, an N,N-dimethyl-N-propyl-N-pentylammonium cation, an N,N-dimethyl-N-propyl-N-hexylammonium cation, an N,N-dimethyl-N-propyl-N-heptylammonium cation, an N,N-dimethyl-N-butyl-N-hexylammonium cation, an N,N-dimethyl-N-butyl-N-heptylammonium cation, an N,N-dimethyl-N-pentyl-N-hexylammonium cation, a trimethylheptylammonium cation, an N,N-diethyl-N-methyl-N-propylammonium cation, an N,N-diethyl-N-methyl-N-pentylammonium cation, an N,N-diethyl-N-methyl-N-heptylammonium cation, an N,N-diethyl-N-propyl-N-pentylammonium cation, a triethylmethylammonium cation, a triethylpropylammonium cation, a triethylpentylammonium cation, a triethylheptylammonium cation, an N,N-dipropyl-N-methyl-N-ethylammonium cation, an N,N-dipropyl-N-methyl-N-pentylammonium cation, an N,N-dipropyl-N-butyl-N-hexylammonium cation, an N,N-dibutyl-N-methyl-N-pentylammonium cation, an N,N-dibutyl-N-methyl-N-hexylammonium cation, a trioctylmethylammonium cation and an N-methyl-N-ethyl-N-propyl-N-pentylammonium cation; trialkylsulfonium cations such as a diethylmethylsulfonium cation, a dibutylethylsulfonium cation and a dimethyldecylsulfonium cation; a triethylmethylphosphonium cation, tributylethylphosphonium cation, a trimethyldecylphosphonium cation and the like.

The anionic component in the ionic liquid shall not specifically be restricted as long as it is turned into an ionic liquid, and it includes, for example, $Cl^-$, $Br^-$, $I^-$, $AlCl_4^-$, $Al_2Cl_7^-$, $BF_4^-$, $PF_6^-$, $ClO_4^-$, $NO_3^-$, $CH_3COO^-$, $CF_3COO^-$, $CH_3SO_3^-$, $CF_3SO_3^-$, $(CF_3SO_2)_2N^-$, $(CF_3SO_2)_3C^-$, $AsF_6^-$, $SbF_6^-$, $NbF_6^-$, $TaF_6^-$, $F(HF)_2^-$, $(CN)_2N^-$, $C_4F_9SO_3^-$, $(C_2F_5SO_2)_2N^-$, $C_3F_7COO^-$ and $(CF_3SO_2)(CF_3CO)N^-$.

Compounds suitably selected from the combinations of the cationic components and the anionic components each described above are used as the ionic liquid, and to be specific, they include 1-butylpyridinium tetrafluoroborate, 1-butylpyridinium hexafluorophosphate, 1-butyl-3-methylpyridinium tetrafluoroborate, 1-butyl-3-methylpyridinium trifluoromethanesulfonate, 1-butyl-3-methylpyridiniumbis(trifluoromethanesulfonyl)imide, 1-butyl-3-methylpyridiniumbis-(pentafluoroethanesulfonyl)imide, 1-hexylpyridinium tetrafluoroborate, 2-methyl-1-pyrroline tetrafluoroborate, 1-ethyl-2-phenylindole tetrafluoroborate, 1,2-dimethylindole tetrafluoroborate, 1-ethylcarbazole tetrafluoroborate, 1-ethyl-3-methylimidazolium tetrafluoroborate, 1-ethyl-3-methylimidazolium acetate, 1-ethyl-3-methylimidazolium trifluoroacetate, 1-ethyl-3-methylimidazolium heptafluorobutylate, 1-ethyl-3-methylimidazolium trifluoromethanesulfonate, 1-ethyl-3-methylimidazolium perfluorobutanesulfonate, 1-ethyl-3-methylimidazoliumdicyanamide, 1-ethyl-3-methylimidazoliumbis(trifluoromethanesulfonyl)imide, 1-ethyl-3-methylimidazoliumbis-(pentafluoroethanesulfonyl)imide, 1-ethyl-3-methylimidazoliumtris(trifluoromethanesulfonyl)imide, 1-butyl-3-methylimidazolium tetrafluoroborate, 1-butyl-3-methylimidazolium hexafluorophosphate, 1-butyl-3-methylimidazolium trifluoroacetate, 1-butyl-3-methylimidazolium heptafluorobutylate, 1-butyl-3-methylimidazolium trifluoromethanesulfonate, 1-butyl-3-methylimidazolium perfluorobutanesulfonate, 1-butyl-3-methylimidazoliumbis-(trifluoromethanesulfonyl)imide, 1-hexyl-3-methylimidazolium bromide, 1-hexyl-3-methylimidazolium chloride, 1-hexyl-3-methylimidazolium tetrafluoroborate, 1-hexyl-3-methylimidazolium hexafluorophosphate, 1-hexyl-3-methylimidazolium trifluoromethanesulfonate, 1-octyl-3-methylimidazolium tetrafluoroborate, 1-octyl-3-methylimidazolium hexafluorophosphate, 1-hexyl-2,3-dimethylimidazolium tetrafluoroborate, 1,2-dimethyl-3-propylimidazoliumbis(trifluoromethanesulfonyl)imide, 1-methylpyrazolium tetrafluoroborate, 3-methylpyrazolium tetrafluoroborate, tetrahexylammoniumbis(trifluoromethanesulfonyl)imide, diallyldimethylammonium tetrafluoroborate, diallyldimethylammonium trifluoromethanesulfonate, diallyldimethylammoniumbis(trifluoromethanesulfonyl)-imide, diallyldimethylammoniumbis-(pentafluoroethanesulfonyl)imide, N,N-diethyl-N-methyl-N-(2-methoxyethyl)ammonium tetrafluoroborate, N,N-diethyl-N-methyl-N-(2-methoxyethyl)ammonium trifluoromethanesulfonate, N,N-diethyl-N-methyl-N-(2-methoxyethyl)ammoniumbis(trifluoromethanesulfonyl)-imide, N,N-diethyl-N-methyl-N-(2-methoxyethyl)-ammoniumbis(pentafluoroethanesulfonyl)imide, glycidyltrimethylammonium trifluoromethanesulfonate, glycidyltrimethylammoniumbis-(trifluoromethanesulfonyl)imide, glycidyltrimethyl-ammoniumbis(pentafluoroethanesulfonyl)imide, 1-butylpyridinium (trifluoromethanesulfonyl)-trifluoroacetoamide, 1-butyl-3-methylpyridinium-(trifluoromethanesulfonyl) trifluoroacetoamide, 1-ethyl-3-methylimidazolium (trifluoromethanesulfonyl)-trifluoroacetoamide, diallyldimethylammonium-(trifluoromethanesulfonyl)trifluoroacetoamide, glycidyltrimethylammonium(trifluoromethanesulfonyl)-trifluoroacetoamide, N,N-dimethyl-N-ethyl-N-propylammoniumbis(trifluoromethanesulfonyl) imide, N,N-dimethyl-N-ethyl-N-butylammoniumbis-(trifluoromethanesulfonyl)imide, N,N-dimethyl-N-ethyl-N-pentylammoniumbis(trifluoromethanesulfonyl)-imide, N,N-dimethyl-N-ethyl-N-hexylammoniumbis-(trifluoromethanesulfonyl)imide, ethyl-N-heptylammoniumbis(trifluoromethanesulfonyl)-imide, N,N-dimethyl-N-ethyl-N-heptylammoniumbis(trifluoromethanesulfonyl)-imide, N,N-dimethyl-N-ethyl-N-nonylammoniumbis-(trifluoromethanesulfonyl)imide, N,N-dimethyl-N,N-dipropylammoniumbis(trifluoromethanesulfonyl)imide, N,N-dimethyl-N-propyl-N-butylammoniumbis-(trifluoromethanesulfonyl)imide, N,N-dimethyl-N-propyl-N-pentylammoniumbis(trifluoromethanesulfonyl)-imide, N,N-dimethyl-N-propyl-N-hexylammoniumbis-(trifluoromethanesulfonyl)-imide, N,N-dimethyl-N-propyl-N-heptylammoniumbis-(trifluoromethanesulfonyl)imide, N,N-dimethyl-N-butyl-N-hexylammoniumbis(trifluoromethanesulfonyl)-imide, N,N-dimethyl-N-butyl-N-heptylammoniumbis-(trifluoromethanesulfonyl)imide, N,N-dimethyl-N-pentyl-N-hexylammoniumbis(trifluoromethanesulfonyl)-imide, N,N-dimethyl-N,N-dihexylammoniumbis-(trifluoromethanesulfonyl)imide, trimethylheptyl-ammoniumbis(trifluoromethanesulfonyl)imide, N,N-diethyl-N-methyl-N-propylammoniumbis-(trifluoromethanesulfonyl)imide, N,N-diethyl-N-methyl-N-pentylammoniumbis(trifluoromethanesulfonyl)-imide, N,N-diethyl-N-methyl-N-heptylammoniumbis-(trifluoromethanesulfonyl)imide, N,N-diethyl-N-propyl-N-pentylammoniumbis(trifluoromethanesulfonyl)-imide, triethylpropylammoniumbis-(trifluoromethanesulfonyl)imide, triethylpentyl-ammoniumbis(trifluoromethanesulfonyl)imide, triethylheptylammoniumbis(trifluoromethanesulfonyl)-imide, N,N-dipropyl-N-methyl-N-ethylammoniumbis-(trifluoromethanesulfonyl)imide, N,N-dipropyl-N-methyl-N-pentylammoniumbis(trifluoromethanesulfonyl)-imide, N,N-dipropyl-N-butyl-N-hexylammoniumbis-(trifluoromethanesulfonyl)imide, N,N-dipropyl-N,N-dihexylammoniumbis(trifluoromethanesulfonyl)imide, N,N-dibutyl-N-methyl-N-pentylammoniumbis-(trifluoromethanesulfonyl)imide, N,N-dibutyl-N-methyl-N-hexylammoniumbis(trifluoromethanesulfonyl)-imide, trioctylmethylammoniumbis-(trifluoromethanesulfonyl)imide and N-methyl-N-ethyl-N-propyl-N-pentylammonium-bis-(trifluoromethanesulfonyl)imide.

<Surfactant>

The surfactant includes, for example, nonionic surfactants such as glycerin fatty acid esters, sorbitan fatty acid esters, polyoxyethylenealkylamines, polyoxyethylenealkylamines fatty acid esters, N-hydroxyethyl-N-2-hydroxyalkylamines, alkyldiethanolamides and the like, anionic surfactants represented by alkyl phosphates, alkyl sulfonates and alkyl benzenesulfonates, cationic surfactants such as quaternary ammonium salts, amide quaternary ammonium salts and the like and amphoteric surfactants such as alkylbetaines, alkylimidazoliniumbetaines and the like.

A blending amount of the antistatic agent described above in the pressure-sensitive adhesive of the present invention is 0.05 to 10 mass parts per 100 mass parts of the pressure-sensitive adhesive resin. If the above blending amount is 0.05 mass part or more, the antistatic performance is exhibited. On the other hand, if a blending amount of the antistatic agent is 10 mass parts or less, a balance between the antistatic performance and a durability of the pressure-sensitive adhesive is improved. From the above points of view, a blending amount of the antistatic agent is preferably 0.05 to 5 mass parts, more preferably 0.06 to 3 mass parts.

A photopolymerization initiator can be added, if necessary, to the pressure-sensitive adhesive material in the present invention. The above photopolymerization initiator includes, for example, benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexyl phenyl ketone, 2-methyl-1-[4-(methylthio)phenyl]-2-morpholino-propane-1-one, 4-(2-hydroxyethoxy)phenyl-2-(hydroxy-2-propyl) ketone, benzophenone, p-phenylbenzophenone, 4,4'-diethylaminobenzophenone, dichlorobenzophenone, 2-methylanthraquinone, 2-ethylanthraquinone, 2-tertiary-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylaminobenzoic esters, oligo[2-hydroxy-2-methyl-1-[4-(1-methylvinyl)phenyl]propanone] and 2,4,6-trimethylbenzoyl-diphenyl-phosphine oxide. They may be used alone or in combination of two or more kinds thereof. A blending amount thereof is selected usually in a range of 0.2 to 20 mass parts per 100 parts of the component (B) described above.

A cross-linking agent can be added, if necessary, as a component (C) to the pressure-sensitive adhesive material in the present invention. The above cross-linking agent shall not specifically be restricted, and optional compounds suitably selected from those which have so far conventionally been used as a cross-linking agent in acrylic base pressure-sensitive adhesives can be used. The above cross-linking agent includes, for example, polyisocyanate compounds, epoxy resins, melamine resins, urea resins, dialdehydes, methylol polymers, aziridine base compounds, metal chelate compounds, metal alkoxides, metal salts and the like, and the polyisocyanate compounds are preferably used.

In this respect, capable of being given as the polyisocyanate compounds are aromatic polyisocyanates such as tolylenediisocyanate, diphenylmethanediisocyanate, xylylenediisocyanate and the like, aliphatic polyisocyanates such as hexamethylenediisocyanate and the like, alicyclic polyisocyanates such as isophoronediisocyanate, hydrogenated diphenylmethanediisocyanate and the like, buret bodies and isocyanurate bodies thereof and adduct bodies which are reaction products thereof with low molecular active hydrogen-containing compounds such as ethylene glycol, propylene glycol, neopentyl glycol, trimethylolpropane, castor oil and the like.

In the present invention, the above cross-linking agents may be used alone or in combination of two or more kinds thereof. A use amount thereof is, though depending on the kind of the cross-linking agent, usually 0.01 to 20 mass parts, preferably 0.1 to 10 mass parts per 100 mass parts of the acrylic base copolymer of the component (A) described above.

Further, a silane coupling agent can be added, if necessary, as a component (D) to the pressure-sensitive adhesive material in the present invention. Addition of the above silane coupling agent improves more an adhesion between the pressure-sensitive adhesive and the glass cell when applying an optically functional film such as a polarizing plate, for example, on a liquid crystal glass cell. The above silane coupling agent is suitably an organosilicon compound which has at least one alkoxysilyl group in a molecule and which is well compatible with a pressure-sensitive adhesive component and has a light transmittance, for example, a substantially transparent compound. An addition amount of the above silane coupling agent falls in a range of preferably 0.001 to 10 mass parts, particularly preferably 0.005 to 5 mass parts per 100 mass parts of the acrylic base copolymer of the component (A) described above.

The specific examples of the silane coupling agent described above include polymerizable unsaturated group-containing silicon compounds such as vinyltrimethoxysilane, vinyltriethoxysilane, methacryloxypropyltrimethoxysilane and the like, silicon compounds having an epoxy structure such as 3-glycidoxypropyltrimethoxysilane, 2-(3,4-epoxycyclohexyl)ethyltrimethoxysilane and the like, amino group-containing silicon compounds such as 3-aminopropyltrimethoxysilane, N-(2-aminoethyl)-3-aminopropyltrimethoxysilane and N-(2-aminoethyl)-3-aminopropylmethyldimethoxysilane and 3-chloropropyltrimethoxysilane and the like. They may be used alone or in combination of two or more kinds thereof.

Various additives usually used for acrylic base pressure-sensitive adhesives, for example, tackifiers, antioxidants, ultraviolet absorbents (UV absorbents), light stabilizers, softening agents and the like can be added, if necessary, to the pressure-sensitive adhesive material in the present invention as long as the object of the present invention is not damaged.

The pressure-sensitive adhesive of the present invention for applying an optically functional film is prepared by irradiating the foregoing pressure-sensitive adhesive material thus obtained with an active energy beam.

The active energy beam includes, for example, a ultraviolet ray and (UV ray) an electron beam. The UV ray described above is obtained by means of a high pressure mercury lamp, an electrodeless lamp, a xenon lamp and the like. On the other hand, the electron beam is obtained by means of an electron beam accelerator and the like. Among the above active energy beams, a UV ray is particularly suited. When using an electron beam, the pressure-sensitive adhesive can be formed without adding a photopolymerization initiator.

A dose of the active energy beam irradiated onto the above pressure-sensitive adhesive material is suitably selected so that the pressure-sensitive adhesive having a storage elastic modulus and an adhesive strength to non-alkali glass which are described later in details can be obtained. In the case of a UV ray, a light intensity falls preferably in a range of 50 to 1000 mW/cm$^2$, and a light quantity falls preferably in a range of 50 to 1000 mJ/cm$^2$. In the case of an electron beam, it falls preferably in a range of 10 to 1000 krad.

It is necessary that the pressure-sensitive adhesive of the present invention has a storage elastic modulus (G') of 0.3 MPa or more at 23° C. If the above storage elastic modulus (G') is 0.3 MPa or more, a satisfactory light leakage-preventing property is obtained when applied to a polarizing plate. An upper limit of the storage elastic modulus (G') at 23° C. shall not specifically be restricted, and it is preferably 50 MPa or less, more preferably 15 MPa or less in order to obtain the pressure-sensitive adhesive having a better adhesion durability. From the viewpoint described above, the storage elastic modulus (G') at 23° C. is particularly preferably 0.35 to 12 MPa, most preferably 0.5 to 5 MPa. Further, the storage elastic modulus (G') at 80° C. is preferably 0.3 MPa or more, more preferably 0.3 to 3 MPa.

The storage elastic modulus (G') described above is a value measured by the following method.

<Measuring Method of Storage Elastic Modulus (G')>

The pressure-sensitive adhesive having a thickness of 30 μm is laminated to prepare a cylindrical test piece of 8 mmφ (diameter)×3 mm thickness, and a storage elastic modulus (G') thereof is measured by a torsional shear method on the following conditions.

Measuring apparatus: dynamic viscoelasticity measuring apparatus "DYNAMIC ANALYZER RDAII" manufactured by Rheometric Corporation Frequency: 1 Hz Temperature: 23° C. and 80° C.

Next, in the pressure-sensitive adhesive of the present invention, a charged voltage on the surface of a layer comprising the above pressure-sensitive adhesive which is measured 5 seconds later since peeling off a release film attaching to the above pressure-sensitive adhesive layer under the environment of 23° C. and a relative humidity of 50% has to be 1.0 kV or less. If the above charged voltage is 1.0 kV or less, static electricity is inhibited from being generated.

Further, in the pressure-sensitive adhesive of the present invention, a half-life of a charged voltage in applying a voltage of 10 kV to the surface of the pressure-sensitive adhesive layer under the environment of 23° C. and a relative humidity of 50% is preferably 300 seconds or shorter. If the above half-life is 300 seconds or shorter, static electricity is quickly attenuated when it is slightly generated, and therefore troubles brought about by the static electricity are inhibited from being caused. The above half-life is preferably 200 seconds or shorter, more preferably 50 seconds or shorter.

A liquid crystal display prepared by applying, for example, a polarizing plate on a liquid crystal glass cell or a retardation film with the pressure-sensitive adhesive of the present invention for applying an optically functional film is less liable to generate static electricity and is excellent in an adhesion durability between the polarizing plate and the liquid crystal glass cell.

Also, the pressure-sensitive adhesive of the present invention has preferably a gel ratio of 85% or more. That is, when an extent of a low molecular component which is extracted with an organic solvent is small, lifting, peeling and stain to the adherend in the optically functional film applied are small in the environment of heating or high temperature and high humidity, and the pressure-sensitive adhesive having a gel ratio of 85% or more has a high durability and a high stability. The gel ratio is more preferably 90 to 99.9%.

In the pressure-sensitive adhesive of the present invention for applying an optically functional film, an adhesive strength to non-alkali glass is preferably 0.2 N/25 mm or more. If the above adhesive strength is 0.2 N/25 mm or more, the optically functional film such as the polarizing plate can be applied on, for example, the liquid crystal glass cell with a satisfactory adhesive strength. The adhesive strength is more preferably 1.0 to 30 N/25 mm.

Further, the adhesive strength to polycarbonate is preferably 5N/25 mm or more. If the above adhesive strength is 5N/25 mm or more, the polarizing plate can be applied on, for example, the retardation film with a satisfactory adhesive strength. The adhesive strength is more preferably 10 to 50 N/25 mm.

A measuring method of the adhesive strength described above shall be described later in details.

The pressure-sensitive adhesive of the present invention is used for applying an optically functional film, and it is suitably used particularly for applying a polarizing plate with a liquid crystal glass cell, a polarizing plate with a retardation film, a retardation film with a retardation film or a retardation film with a liquid crystal glass cell.

To be more specific, the pressure-sensitive adhesive is applied to a polarizing plate comprising a polarizing film alone and can be used for applying the above polarizing plate on, for example, a liquid crystal glass cell. In particular, the pressure-sensitive adhesive is applied to a polarizing plate comprising a polarizing film integrated with a viewing angle expanding film or a retardation film and can preferably be used for applying the above polarizing plate on, for example, a liquid crystal glass cell.

The polarizing plate comprising a polarizing film integrated with a retardation film includes, for example, a polarizing plate comprising a triacetyl cellulose (TAC) film applied on one surface of a polyvinyl alcohol base polarizer with an adhesive and a retardation film obtained by biaxially stretching a cycloolefin base polymer applied on the other surface with the adhesive. In the above case, the pressure-sensitive adhesive layer is provided on the surface of a retardation film side in the polarizing plate.

The foregoing polarizing plate comprising a polarizing film integrated with a viewing angle expanding film includes, for example, a polarizing plate in which a viewing angle expanding function layer comprising a discotic liquid crystal is provided by coating on one face of a polarizing film prepared by applying a triacetyl cellulose (TAC) film respectively on both faces of a polyvinyl alcohol base polarizer and a polarizing plate on which a viewing angle expanding film is applied on the polarizing film with an adhesive. In this case, the pressure-sensitive adhesive is provided on the side of the viewing angle expanding function layer or the viewing angle expanding film described above.

Also when a retardation film is present, as shown in FIG. 2, between a polarizing plate and a liquid crystal glass cell, the pressure-sensitive adhesive of the present invention for applying an optically functional film can suitably be used. That is, a polarizing plate comprising a polarizing film alone is applied on the retardation film with the pressure-sensitive adhesive of the present invention to produce an optical film, and the retardation film of the above optical film is applied on the liquid crystal glass cell with the pressure-sensitive adhesive.

In this respect, when the polarizing plate is applied on the retardation film with the pressure-sensitive adhesive of the present invention, pressure-sensitive adhesives other than the pressure-sensitive adhesive of the present invention can also be used as a pressure-sensitive adhesive for applying the retardation film on the liquid crystal glass cell and shall not specifically be restricted, but the pressure-sensitive adhesive of the present invention is more preferably used. The pressure-sensitive adhesives other than the pressure-sensitive adhesive of the present invention include, for example, a pressure-sensitive adhesive composition comprising an acrylic base polymer, a cross-linking agent and a silane compound, which is disclosed in Japanese Patent Application Laid-Open No. 131033/1999.

The present invention provides as well an optically functional film with the pressure-sensitive adhesive having a layer comprising the pressure-sensitive adhesive of the present invention described above on the optically functional film such as a polarizing plate. To be more specific, the optically functional film includes a polarizing plate with a pressure-sensitive adhesive, and this polarizing plate may be, as described above, a polarizing plate comprising a polarizing film alone. In the case of a constitution shown in FIG. 1, however, a polarizing plate comprising a polarizing film integrated with a viewing angle expanding film is preferred.

The layer comprising the above pressure-sensitive adhesive has a thickness of usually 5 to 100 μm, preferably 10 to 50 μm and more preferably 10 to 30 μm.

A production process for the above optically functional film with the pressure-sensitive adhesive may be any process as long as it is a process in which the optically functional film provided with a layer comprising the pressure-sensitive adhesive of the present invention on the optically functional film such as a polarizing plate is obtained, and it shall not specifically be restricted. According to the process of the present invention shown below, the desired optically functional film with the pressure-sensitive adhesive can efficiently be produced.

In the process of the present invention, the optically functional film such as the polarizing plate is applied on the pressure-sensitive adhesive material layer provided on a release layer of a release sheet, and then the side of the above release sheet is irradiated with an active energy beam so that the pressure-sensitive adhesive material layer described above is turned into a layer having the prescribed characteristics described above which is constituted from the pressure-sensitive adhesive of the present invention, whereby the optically functional film with the pressure-sensitive adhesive of the present invention is obtained.

The release sheet described above includes a sheet prepared by coating a releasing agent such as a silicone resin on a plastic film such as a polyester film of polyethylene terephthalate, polybutylene terephthalate, polyethylene naphthalate or the like and a polyolefin film of polypropylene, polyethylene or the like to provide a release layer. A thickness of the above release sheet shall not specifically be restricted and is usually 20 to 150 μm.

The pressure-sensitive adhesive material and the irradiating conditions of the active energy beam have already been explained in the pressure-sensitive adhesive of the present invention for applying an optically functional film described above.

Capable of being used as a method for providing the pressure-sensitive adhesive material layer on the release sheet is, for example, a method in which a pressure-sensitive adhesive material containing a solvent is coated by means of a bar coating method, a knife coating method, a roll coating method, a blade coating method, a die coating method, a gravure coating method or the like to form a coating film and in which the coating film is dried. The drying conditions shall not specifically be restricted, and it is dried usually at 50 to 150° C. for 10 seconds to 10 minutes. The solvent includes, for example, toluene, ethyl acetate, methyl ethyl ketone and the like.

In the case of a constitution shown in FIG. 2, a polarizing plate comprises a polarizing film alone in many cases, and a layer comprising a pressure-sensitive adhesive for a polarizing plate has the same thickness as described above. A production process for the polarizing plate with the pressure-sensitive adhesive in the constitution shown in FIG. 2 may be any process as long as it is a process in which a polarizing plate provided thereon with a layer comprising the pressure-sensitive adhesive of the present invention is obtained as is the case with what has been described above, and it shall not specifically be restricted. The polarizing plate can efficiently be produced by the production process of the present invention described above.

Further, in the case of the constitution shown in FIG. 2, prepared in advance is a pressure-sensitive adhesive sheet in which the pressure-sensitive adhesive (the pressure-sensitive adhesive for applying an optically functional film) for a polarizing plate described above is interposed so that it is brought into contact with the release layer sides of two release sheets, and the above pressure-sensitive adhesive sheet can be used to apply the polarizing plate on the retardation film. In this case, when the component (B) described above is used as the pressure-sensitive adhesive, an active energy beam may be irradiated after the pressure-sensitive adhesive material is interposed between two release sheets, or the pressure-sensitive adhesive material layer may be provided on one release sheet and irradiated with the active energy beam, and then it may be interposed with the other release sheet. The irradiation conditions of the active energy beam are selected so that obtained is a layer having the prescribed characteristics described above which is constituted from the pressure-sensitive adhesive of the present invention.

When the above pressure-sensitive adhesive interposed between two release sheets is used to produce the optical film of the present invention, one release sheet is peeled off, and the pressure-sensitive adhesive sheet is applied on the polarizing plate or the retardation film by an ordinary method. If a peeling strength required for peeling off the release sheet from the pressure-sensitive adhesive layer is too high, the surface state of the pressure-sensitive adhesive is deteriorated, and if it is too low, the release sheet is partially peeled off in storing in a certain case. From the above viewpoint, the peeling strength is preferably 5 to 300 mN/25 mm at a peeling speed of 30 m/minute and 5 to 200 mN/25 mm at a peeling speed of 0.3 m/minute.

EXAMPLES

Next, the present invention shall be explained below in further details with reference to examples, but the present invention shall by no means be restricted by these examples.

The performances of the pressure-sensitive adhesives and the polarizing plates with the pressure-sensitive adhesive which were obtained in Examples 1 to 16 and Comparative Examples 1 and 2 were determined by methods shown below.

(1) Storage Elastic Modulus of Pressure-Sensitive Adhesive

The storage elastic moduli at 23° C. and 80° C. were measured according to the method described in the present specification.

(2) Adhesive Strength (Adhesive Strength to Non-Alkali Glass)

A sample having a width of 25 mm and a length of 100 mm was cut out from the polarizing plate with the pressure-sensitive adhesive, and after the release sheets were peeled off therefrom (thickness of the pressure-sensitive adhesive: 25 μm), the sample was applied on non-alkali glass ("1737" manufactured by Corning Incorporated) and then pressurized in an autoclave manufactured by Kurihara Manufactory Inc. on the conditions of 0.5 MPa, 50° C. and 20 minutes. Thereafter, it was left standing for 24 hours or 168 hours under the environment of 23° C. and a relative humidity of 50%, and then the adhesive strength to the non-alkali glass was measured under the above environment by means of a tensile tester (Tensilon manufactured by Orientech Co., Ltd.) on the conditions of a peeling rate of 300 mm/minute and a peeling angle of 180°.

(2') Adhesive Strength (Adhesive Strength to Polycarbonate)

The adhesive strength to polycarbonate was measured in the same manner as (2), except that a polycarbonate film ("Pure Ace C-110-100", thickness: 100 μm, manufactured by Teijin Chemicals Ltd.) was used in place of non-alkali glass. The polycarbonate film fixed on a glass plate having a thickness of 0.7 mm with a pressure-sensitive adhesive double coated tape having a strong adhesiveness was used.

(3) Gel Ratio

The pressure-sensitive adhesive having a thickness of 25 μm was sampled in a size of 80 mm×80 mm and wrapped in a polyester-made mesh (mesh size: 200) to weigh precisely only the weight of the pressure-sensitive adhesive by means of a precision balance. The weight thereof is set as M1. A Soxhlet extractor was used to dip the pressure-sensitive adhesive in an ethyl acetate solvent, and the solvent was refluxed to carry out treatment for 16 hours. Then, the pressure-sensitive adhesive was taken out and dried in air for 24 hours under the environment of a temperature of 23° C. and relative humidity of 50%, and it was further dried in an oven of 80° C. for 12 hours. The weight of the pressure-sensitive adhesive alone after dried was weighed by means of a precision balance. The weight thereof is set as M2. The gel ratio (%) is represented by (M2/M1)×100.

(4) Peeling Strength

The polarizing plate with the pressure-sensitive adhesive was cut in a width of 25 mm and a length of 300 mm, and a polarizing plate side was fixed on a glass plate ("1737" manufactured by Corning Incorporated) having a thickness of 0.7 mm with a pressure-sensitive adhesive double coated tape. The release film was peeled off at a peeling angle of 180° and a peeling speed of 0.3 m/minute or 30 m/minute to measure the peeling strength. Used as the measuring equipment were a tensile tester ("Tensilon" manufactured by Orientech Co., Ltd.) in the case of a peeling speed of 0.3 m/minute and a high speed peeling tester (manufactured by TESTER SANGYO CO., LTD.) in the case of a peeling speed of 30 m/minute.

(5) Durability of the Polarizing Plate with the Pressure-Sensitive Adhesive

The polarizing plate with the pressure-sensitive adhesive was controlled to a size of 233 mm×309 mm by means of a cutting apparatus (Super Cutter "PN1-600" manufactured by OGINO SEIKI CO., LTD.) and applied on non-alkali glass ("1737" manufactured by Corning Incorporated), and then it was pressurized in an autoclave manufactured by Kurihara Manufactory Inc. on the conditions of 0.5 MPa, 50° C. and 20 minutes. Thereafter, it was put under the environment of the respective durability conditions described below, taken out after 200 hours and observed by means of a loupe of 10 magnifications under the environment of a temperature of 23° C. and relative humidity of 50% to evaluate the durability according to the following judging criteria.

GOOD: no defects in a region of 0.6 mm or more from an outer circumferential end part in four sides BAD: defects of 0.1 mm or more in abnormality of appearance of the pressure-sensitive adhesive such as lifting, peeling, bubbles and stripes in a region of 0.6 mm or more from an outer circumferential end part in any one side of four sides <Durability Conditions>

Environment of 60° C. and a relative humidity of 90%, environment of 80° C., environment of 90° C.

Heat shock test of −30° C. ⇔70° C. for each 30 minutes, 200 cycles (6) Light Leakage Performance The polarizing plate with the pressure-sensitive adhesive was controlled to a size of 233 mm×309 mm by means of the cutting apparatus (Super Cutter "PN1-600" manufactured by OGINO SEIKI CO., LTD.) and applied on non-alkali glass ("1737" manufactured by Corning Incorporated), and then it was pressurized in an autoclave manufactured by Kurihara Manufactory Inc. on the conditions of 0.5 MPa, 50° C. and 20 minutes. The polarizing plates with the pressure-sensitive adhesives were applied on front and back sides of the non-alkali glass so that a polarizing axis assumed a cross nicol state. It was left standing in the above state at 80° C. for 200 hours. Then, it was left standing for 2 hours under the environment of 23° C. and a relative humidity of 50% to evaluate a light leakage property under the above environment by a method shown below.

Figure 3:
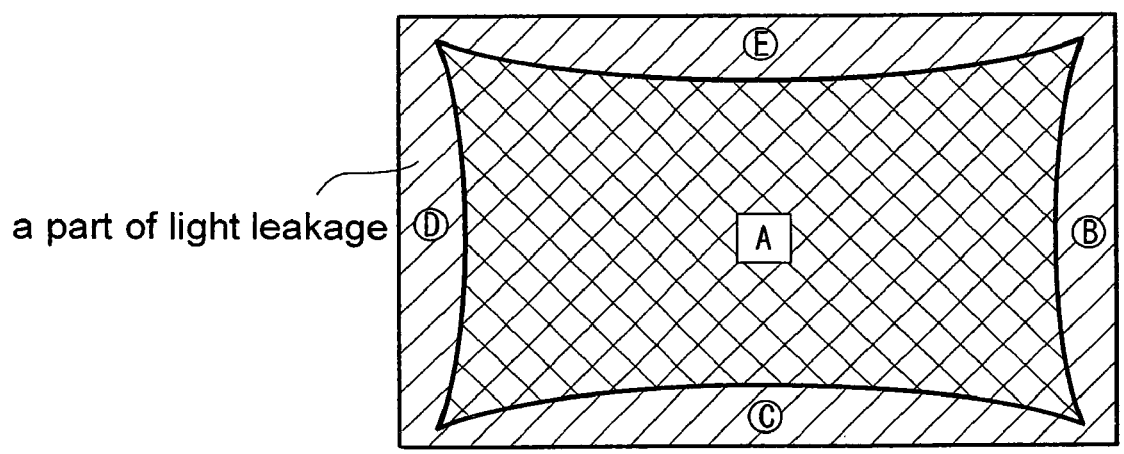
FIG. 3 is an explanatory drawing showing a method for evaluating a light leaking property of the polarizing plates with the pressure-sensitive adhesive obtained in the examples and the comparative examples.

MCPD-2000 manufactured by OTSUKA ELECTRONICS CO., LTD. was used to measure brightnesses in the respective areas shown in FIG. 3, and a brightness difference $\Delta L^*$ was determined by an equation:

$$\Delta L^* = [(b+c+d+e)/4] - a$$

(wherein a, b, c, d and e each are brightnesses at measuring points (one point in the central part of each area) settled in advance respectively in an A area, a B area, a C area, a D area and an E area), and it shows a light leakage property. It is shown that the smaller the value of $\Delta L^*$ is, the smaller the light leakage is.

(7) Peeling Antistatic Property

Figure 4:
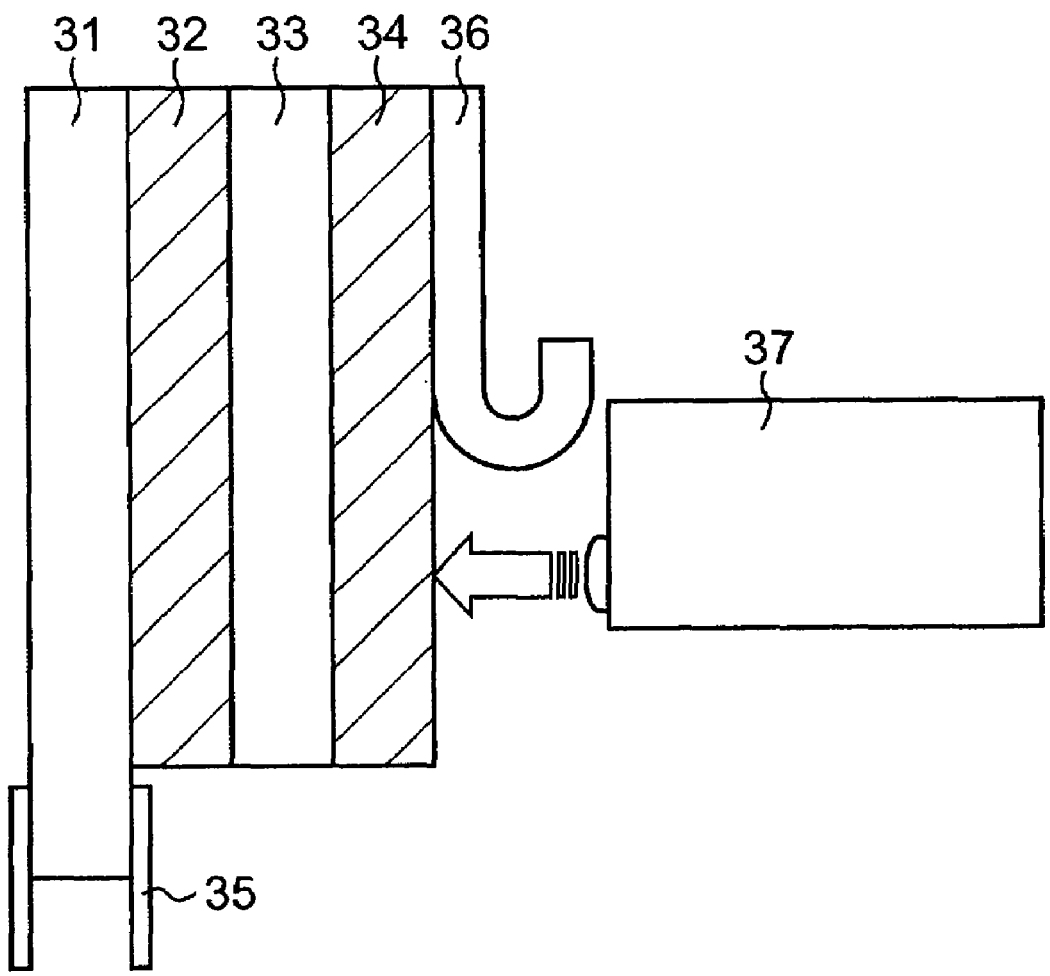
FIG. 4 is an explanatory drawing showing a method for evaluating a peeling antistatic property of the polarizing plates with the pressure-sensitive adhesive obtained in the examples and the comparative examples.

A sample having a width of 50 mm and a length of 100 mm was cut out from the polarizing plate with the pressure-sensitive adhesive. An acrylic pressure-sensitive adhesive 32 was coated, as shown in FIG. 4, on a polyethylene plate 31, and a polarizing plate 33 with the pressure-sensitive adhesive was mounted thereon so that a surface of the polarizing plate 33 with the pressure-sensitive adhesive on which a pressure-sensitive adhesive layer 34 was not formed was brought into contact with the polyethylene plate 31 to apply the polarizing plate 33 with the pressure-sensitive adhesive on the polyethylene plate 31. The polyethylene plate 31 was fixed with a chuck 35. It was left standing for 24 hours under the environment of a temperature of 23° C. and relative humidity of 50%. Then, a release film 36 was fixed on a high speed peeling tester (manufactured by TESTER SANGYO CO., LTD.) and peeled off at a peeling speed of 30 m/minute and a peeling angle of 180° to measure a potential (charged voltage caused by peeling) generated on the surface of the pressure-sensitive adhesive by means of a potential measuring device 37 ("STATIRON-DZ3" manufactured by SHISHIDO ELECTROSTATIC, LTD.) fixed in a prescribed position. This measurement was carried out at a measuring distance of 50 mm under the environment of a temperature of 23° C. and relative humidity of 50% after 5 seconds and 60 seconds since the release film was peeled off.

(8) Half-Life in Applying a Voltage of 10 kV

A sample of 40 mm×40 mm was cut out from the polarizing plate with the pressure-sensitive adhesive, and the release film was peeled off under the environment of a temperature of 23° C. and relative humidity of 50% to apply voltage on the exposed surface of the pressure-sensitive adhesive on the following conditions by means of an electrified charge attenuation measuring device ("STATIC HONESTMETER TYPE S-510", a high voltage direct current corona discharge system, a chopper type, manufactured by SHISHIDO ELECTROSTATIC, LTD.). Voltage observed when applying of voltage was stopped was read as a charged voltage, and time in which the charged voltage was halved was set to a half-life. A measuring time of the half-life was set to 600 seconds.

<Voltage Applying Conditions>

Applied voltage: 10 kV
Applying time: one minute
Revolution: 1300 rpm
Distance between an applied part (driver) and a voltage measuring part (receiver): 20 mm Examples 1 to 16 and Comparative Examples 1 and 2

An ethyl acetate solution (solid content: 14 mass %) of a pressure-sensitive adhesive material (a) having a composition (solid content) shown in Table 1 was prepared, and it was coated on a release layer of a polyethylene terephthalate-made release film having a thickness of 38 μm ("SP-PET3811" manufactured by LINTEC Corporation) as a release sheet by means of a knife coater so that the thickness after dried was 25 μm. Then, it was subject to drying treatment at 90° C. for one minute to form a pressure-sensitive adhesive material layer.

Then, a polarizing film with a discotic crystal liquid layer which was a polarizing plate comprising a polarizing film integrated with a viewing angle expanding film was applied on the pressure-sensitive adhesive material layer so that the discotic crystal liquid layer was brought into contact with the pressure-sensitive adhesive material layer. After 30 minutes passed since applied, the release film side was irradiated with a ultraviolet (UV) ray on the following conditions, and it was cured for 10 days under the environment of a temperature of 23° C. and relative humidity of 50% to produce a polarizing plate with the pressure-sensitive adhesive.

<UV Irradiating Conditions>

Electrodeless lamp using an H valve, manufactured by Fusion Co., Ltd.

Illuminance: 600 mW/cm$^2$, light quantity: 150 mJ/cm$^2$

"UVPF-36" manufactured by EYEGRAPHICS Co., Ltd. was used as a UV light intensity and light quantity meter.

The evaluation results of the performances of the pressure-sensitive adhesives and the polarizing plates with the pressure-sensitive adhesive are shown in Table 2.

TABLE 1

Composition (mass part) of pressure-sensitive adhesive material

| | (A) | | (B) | | (C) | (D) | | |
|---|---|---|---|---|---|---|---|---|
| | Acrylic base copolymer[1] | Acrylic base copolymer[2] | Multifunctional acrylic base monomer[3] | Photo-polymerization initiator[4] | Isocyanate cross-linking agent[5] | Silane coupling agent[6] | Antistatic agent | |
| | | | | | | | Kind | Amount |
| Example 1 | 100 | 10 | 15 | 1.5 | 4 | 0.03 | IL-P14[7] | 0.1 |
| Example 2 | 100 | 10 | 15 | 1.5 | 4 | 0.03 | IL-P14[7] | 1.0 |
| Example 3 | 100 | 10 | 15 | 1.5 | 4 | 0.03 | IL-C1[8] | 0.1 |
| Example 4 | 100 | 10 | 15 | 1.5 | 4 | 0.03 | IL-C1[8] | 1.0 |
| Example 5 | 100 | 10 | 15 | 1.5 | 4 | 0.03 | 0862-20R[9] | 0.1 |
| Example 6 | 100 | 10 | 15 | 1.5 | 4 | 0.03 | 0862-20R[9] | 1.0 |
| Example 7 | 100 | 10 | 15 | 1.5 | 4 | 0.03 | PC-3560M[10] | 0.1 |
| Example 8 | 100 | 10 | 15 | 1.5 | 4 | 0.03 | PC-3560M[10] | 1.0 |
| Example 9 | 100 | — | 15 | 1.5 | 4 | 0.03 | IL-P14[7] | 0.1 |
| Example 10 | 100 | — | 15 | 1.5 | 4 | 0.03 | IL-P14[7] | 1.0 |
| Example 11 | 100 | — | 15 | 1.5 | 4 | 0.03 | IL-C1[8] | 0.1 |
| Example 12 | 100 | — | 15 | 1.5 | 4 | 0.03 | IL-C1[8] | 1.0 |
| Example 13 | 100 | — | 15 | 1.5 | 4 | 0.03 | 0862-20R[9] | 0.1 |
| Example 14 | 100 | — | 15 | 1.5 | 4 | 0.03 | 0862-20R[9] | 1.0 |
| Example 15 | 100 | — | 15 | 1.5 | 4 | 0.03 | PC-3560M[10] | 0.1 |
| Example 16 | 100 | — | 15 | 1.5 | 4 | 0.03 | PC-3560M[10] | 1.0 |
| Comparative Examples 1 | 100 | 10 | 15 | 1.5 | 4 | 0.03 | — | — |
| Comparative Examples 2 | 100 | — | — | — | 4 | 0.03 | IL-P14[7] | 0.1 |

Remarks:

1) Acrylic base copolymer: a copolymer having a weight-average molecular weight of 1,800,000 which is obtained by polymerizing butyl acrylate with hydroxyethyl acrylate in a mass ratio of 99:1 according to a conventional method 2) Acrylic base copolymer: a copolymer having a weight-average molecular weight of 1,800,000 which is obtained by polymerizing butyl acrylate and acrylic acid in a mass ratio of 95:5 according to a conventional method 3) Multifunctional acrylic monomer: tris(acryloxyethyl) isocyanurate, molecular weight=423, trifunctional type (trade name: "Aronix M-315", manufactured by TOAGOSEI CO., LTD.)

4) Photopolymerization initiator: mixture of benzophenone and 1-hydroxycyclohexyl phenyl ketone in a mass ratio of 1:1, "Irgacure 500", manufactured by Ciba Specialty Chemicals Co., Ltd.

5) Isocyanate base cross-linking agent: trimethylolpropane-modified tolylenediisocyanate ("Coronate L", manufactured by NIPPON POLYURETHANE INDUSTRY CO., LTD.)

6) Silane coupling agent: 3-glycidoxypropyltrimethoxysilane ("KBM-403", manufactured by Shin-Etsu Chemical Co., Ltd.)

7) Antistatic agent: ionic liquid containing a pyridinium cation ("IL-P14" manufactured by Koei Chemical Co., Ltd.)

8) Antistatic agent: ionic liquid containing a pyrrolidinium cation ("IL-C1" manufactured by Koei Chemical Co., Ltd.)

9) Antistatic agent: an ionic conductor containing polyester-polyol using adipic acid as a raw material and $Li(CF_3SO_2)_2N$ ("0862-20R", liquid at room temperature, manufactured by Sanko Chemical Co., Ltd.)

10) Antistatic agent: an ionic conductor containing organopolysiloxane having an oxyalkylene group and $LiClO_4$ ("PC-3560M", liquid at room temperature, manufactured by Marubishi Oil Chemical Co., Ltd.)

TABLE 2

Performance of pressure-sensitive adhesive

| | Storage elastic Modulus (MPa) | | Adhesive strength (N/25 mm) (to non-alkali glass) | | Adhesive strength (N/25 mm) (to polycarbonate) | | Gel ratio (%) | Releasing strength (mN/25 mm) | |
|---|---|---|---|---|---|---|---|---|---|
| | 23° C. | 80° C. | 24 hr | 168 hr | 24 hr | 168 hr | | 0.3 m/min | 30 m/min |
| Example 1 | 0.93 | 0.41 | 2.5 | 3.4 | 2.0 | 2.0 | 96 | 20 | 90 |
| Example 2 | 0.92 | 0.40 | 1.6 | 2.8 | 1.8 | 1.6 | 95 | 20 | 95 |
| Example 3 | 0.93 | 0.41 | 2.5 | 4.0 | 2.0 | 2.0 | 96 | 20 | 95 |
| Example 4 | 0.92 | 0.40 | 2.1 | 3.3 | 1.5 | 1.4 | 95 | 20 | 95 |
| Example 5 | 0.93 | 0.41 | 4.0 | 6.1 | 2.2 | 2.0 | 96 | 20 | 95 |
| Example 6 | 0.92 | 0.40 | 2.8 | 8.5 | 2.0 | 2.4 | 95 | 20 | 90 |
| Example 7 | 0.92 | 0.40 | 2.0 | 3.0 | 1.8 | 2.1 | 95 | 20 | 95 |

TABLE 2-continued

| | Performance of pressure-sensitive adhesive | | | | | | | | |
|---|---|---|---|---|---|---|---|---|---|
| | Storage elastic Modulus (MPa) | | Adhesive strength (N/25 mm) (to non-alkali glass) | | Adhesive strength (N/25 mm) (to polycarbonate) | | Gel ratio | Releasing strength (mN/25 mm) | |
| | 23° C. | 80° C. | 24 hr | 168 hr | 24 hr | 168 hr | (%) | 0.3 m/min | 30 m/min |
| Example 8 | 0.89 | 0.33 | 0.5 | 1.8 | 0.5 | 0.7 | 94 | 20 | 95 |
| Example 9 | 0.93 | 0.41 | 34.0 | 50.0 | 22.0 | 23.0 | 96 | 20 | 90 |
| Example 10 | 0.92 | 0.40 | 33.0 | 50.0 | 21.5 | 21.5 | 95 | 20 | 90 |
| Example 11 | 0.93 | 0.41 | 34.0 | 50.0 | 22.0 | 22.0 | 96 | 20 | 90 |
| Example 12 | 0.92 | 0.40 | 33.0 | 50.0 | 21.5 | 21.5 | 95 | 20 | 90 |
| Example 13 | 0.93 | 0.41 | 34.0 | 50.0 | 22.0 | 22.0 | 96 | 20 | 95 |
| Example 14 | 0.92 | 0.40 | 35.0 | 50.0 | 22.0 | 23.0 | 95 | 20 | 95 |
| Example 15 | 0.89 | 0.40 | 32.5 | 50.0 | 21.0 | 21.0 | 95 | 20 | 95 |
| Example 16 | 0.89 | 0.33 | 30.5 | 50.0 | 20.0 | 20.0 | 94 | 20 | 95 |
| Comparative Examples 1 | 0.94 | 0.43 | 3.4 | 5.8 | 3.0 | 3.0 | 96 | 20 | 85 |
| Comparative Examples 2 | 0.09 | 0.04 | 1.0 | 0.3 | 1.0 | 1.5 | 80 | 65 | 240 |

TABLE 3

| | Performance of polarizing plate with pressure-sensitive adhesive | | | | | Peeling antistatic property (charged voltage kV) | | Half-life in applying |
|---|---|---|---|---|---|---|---|---|
| | Durability | | | | Light leakage | | | |
| | 80° C. | 90° C. | 60° C., 90% RH | Heat shock | performance [ΔL*] | After 5 seconds | After 60 seconds | 10 kV (seconds) |
| Example 1 | GOOD | GOOD | GOOD | GOOD | 0.395 | 0.16 | 0.01 | 6 |
| Example 2 | GOOD | GOOD | GOOD | GOOD | 0.523 | 0.08 | 0.00 | 2 |
| Example 3 | GOOD | GOOD | GOOD | GOOD | 0.415 | 0.11 | 0.01 | 4 |
| Example 4 | GOOD | GOOD | GOOD | GOOD | 0.593 | 0.08 | 0.01 | 2 |
| Example 5 | GOOD | GOOD | GOOD | GOOD | 0.448 | 0.57 | 0.03 | 6 |
| Example 6 | GOOD | GOOD | GOOD | GOOD | 0.353 | 0.62 | 0.03 | 13 |
| Example 7 | GOOD | GOOD | GOOD | GOOD | 0.498 | 0.90 | 0.20 | 180 |
| Example 8 | GOOD | GOOD | GOOD | GOOD | 0.428 | 0.81 | 0.05 | 20 |
| Example 9 | GOOD | GOOD | GOOD | GOOD | 0.382 | 0.20 | 0.01 | 6 |
| Example 10 | GOOD | GOOD | GOOD | GOOD | 0.558 | 0.09 | 0.00 | 2 |
| Example 11 | GOOD | GOOD | GOOD | GOOD | 0.397 | 0.13 | 0.01 | 5 |
| Example 12 | GOOD | GOOD | GOOD | GOOD | 0.578 | 0.07 | 0.01 | 3 |
| Example 13 | GOOD | GOOD | GOOD | GOOD | 0.439 | 0.55 | 0.03 | 5 |
| Example 14 | GOOD | GOOD | GOOD | GOOD | 0.389 | 0.48 | 0.03 | 2 |
| Example 15 | GOOD | GOOD | GOOD | GOOD | 0.506 | 0.93 | 0.21 | 180 |
| Example 16 | GOOD | GOOD | GOOD | GOOD | 0.431 | 0.84 | 0.05 | 20 |
| Comparative Examples 1 | GOOD | GOOD | GOOD | GOOD | 0.653 | 1.50 | 0.51 | 600< |
| Comparative Examples 2 | BAD | BAD | BAD | BAD | 6.50 | 0.22 | 0.03 | 60 |

INDUSTRIAL APPLICABILITY

The pressure-sensitive adhesive of the present invention for an optically functional film is suitably applied to a polarizing plate, particularly a polarizing plate integrated with a viewing angle expanding film and the like or a polarizing plate comprising a retardation film laminated thereon and can adhere the above polarizing plate on a liquid crystal cell or a retardation film with good adhesion, and a liquid crystal display obtained therefrom is less liable to cause light leakage even under the environment of high temperature and high humidity. Further, the pressure-sensitive adhesive of the present invention has the characteristics that it can readily be peeled off when applied mistakenly and that static electricity is less liable to be produced when peeling off a release film from a pressure-sensitive adhesive layer.

What is claimed is:
1. A pressure-sensitive adhesive comprising an active-energy irradiation cured mixture,
wherein prior to curing:
an uncured mixture comprises
a pressure-sensitive adhesive resin, and
an antistatic agent,
the pressure-sensitive adhesive resin comprises
an acrylic copolymer (A), and
an active energy beam-curable compound (B), and
a content ratio of the acrylic copolymer (A) to the active energy beam-curable compound (B) in the pressure-sensitive adhesive resin ranges from 100:5 to 100:50 in terms of a mass ratio;
wherein the pressure sensitive adhesive has a storage elastic modulus (G') at 23° C. of 0.3 MPa or more, a charged voltage on a surface of a layer comprising the pressure-sensitive adhesive is 1.0 kV or less, the charged voltage being measured at 5 seconds after peeling off a release film attaching to the layer in an environment of 23° C. and a relative humidity of 50%;

wherein the pressure sensitive adhesive storage elastic modulus (G') at 23° C. is from 0.3 to 15 MPa;

wherein the active energy beam-curable compound (B) is a multifunctional (meth)acrylate base monomer having a molecular weight of less than 1000; and wherein the multifunctional (meth)acrylate base monomer has a cyclic structure.

2. The pressure-sensitive adhesive as described in claim 1, wherein a half-life of a charged voltage resulting from applying a voltage of 10 kV to the surface of the pressure-sensitive adhesive layer for one minute in an environment of 23° C. and a relative humidity of 50% is 300 seconds or shorter.

3. The pressure-sensitive adhesive as described in claim 1, wherein in the uncured mixture, a blending amount of the antistatic agent is from 0.05 to 10 mass parts per 100 mass parts of the pressure-sensitive adhesive resin.

4. The pressure-sensitive adhesive as described in claim 1, wherein the pressure sensitive adhesive has a second storage elastic modulus at 80° C. of 0.3 MPa or more.

5. The adhesive as described in claim 4, wherein the pressure sensitive adhesive second storage elastic modulus at 80° C. is from 0.3 to 10 MPa.

6. A laminate comprising the pressure-sensitive adhesive as described in claim 1, and an optically functional film which is a polarizing plate and/or a retardation film.

7. The pressure-sensitive adhesive as described in claim 1, wherein the multifunctional (meth)acrylate base monomer has an isocyanurate structure.

8. The pressure-sensitive adhesive as described in claim 1, wherein the pressure-sensitive adhesive resin further comprises a cross-linking agent (C).

9. The pressure-sensitive adhesive as described in claim 1, wherein the pressure-sensitive adhesive resin further comprises a silane coupling agent (D).

10. The laminate as described in claim 6, wherein the optically functional film is a polarizing plate, and wherein the polarizing plate comprises a polarizing film integrated with a viewing angle expanding film.

11. The pressure-sensitive adhesive as described in claim 1, having an adhesive strength to non-alkali glass of 0.2 N/25 mm or more.

12. The pressure-sensitive adhesive as described in claim 1, having an adhesive strength to polycarbonate of 5 N/25 mm or more.

13. The pressure-sensitive adhesive as described in claim 1, wherein a gel ratio is 85% or more.

14. An optically functional adhesive film comprising a layer comprising the pressure-sensitive adhesive as described in claim 1 on an optically functional film.

15. A process for producing the optically functional adhesive film as described in claim 14, comprising applying an optically functional film on a pressure-sensitive adhesive material layer provided on a release layer of a release sheet to form a laminate comprising a release sheet side and then irradiating the release sheet side with an active energy beam.

16. An optical film comprising a polarizing plate and a retardation film, wherein the polarizing plate and the retardation film are laminated with the pressure-sensitive adhesive as described in claim 1.

17. A pressure-sensitive adhesive sheet comprising the pressure-sensitive adhesive as described in claim 1 interposed between two release sheets so that the pressure-sensitive adhesive is brought into contact with release layer sides of the release sheets.

18. A production process for an optically functional film, comprising applying a polarizing plate on a retardation film with the pressure-sensitive adhesive sheet as described in claim 17.

19. A pressure-sensitive adhesive made by a process comprising curing a mixture with active-energy irradiation;
wherein the mixture comprises
a pressure-sensitive adhesive resin, and
an antistatic agent,
the pressure-sensitive adhesive resin comprises
an acrylic copolymer (A), and
an active energy beam-curable compound (B), and
a content ratio of the acrylic copolymer (A) to the active energy beam-curable compound (B) in the pressure-sensitive adhesive resin ranges from 100:5 to 100:50 in terms of a mass ratio;
wherein the pressure-sensitive adhesive has a storage elastic modulus (G') at 23° C. of 0.3 MPa or more, and a charged voltage on a surface of a layer comprising the adhesive is 1.0 kV or less, the charged voltage being measured 5 seconds after peeling off a release film attaching to the layer in an environment of 23° C. and a relative humidity of 50%,
wherein the pressure sensitive adhesive storage elastic modulus (G') at 23° C. is from 0.3 to 15 MPa;
wherein the active energy beam-curable compound (B) is a multifunctional (meth)acrylate base monomer having a molecular weight of less than 1000; and
wherein the multifunctional (meth)acrylate base monomer has a cyclic structure.

20. A method of adhering a first substrate to a second substrate, comprising, adhering the first substrate to the second substrate with the pressure-sensitive adhesive of claim 1; wherein the first substrate and the second substrate are, in combination, selected from the group consisting of:
a polarizing plate/a liquid crystal glass cell;
a polarizing plate/a retardation film;
a retardation film/a retardation film; and
a retardation film/a liquid crystal glass cell.

* * * * *